United States Patent

Mikami et al.

(10) Patent No.: US 9,531,268 B2
(45) Date of Patent: Dec. 27, 2016

(54) SWITCHING POWER SUPPLY AND ELECTRONIC CONTROL UNIT

(71) Applicant: DENSO CORPORATION, Kariya, Aichi-pref. (JP)

(72) Inventors: Yuki Mikami, Okazaki (JP); Yoshiyuki Kawase, Nagoya (JP); Ryoichi Shiraishi, Okazaki (JP)

(73) Assignee: DENSO CORPORATION, Kariya (JP)

( * ) Notice: Subject to any disclaimer, the term of this patent is extended or adjusted under 35 U.S.C. 154(b) by 194 days.

(21) Appl. No.: 14/548,339

(22) Filed: Nov. 20, 2014

(65) Prior Publication Data

US 2015/0146328 A1 May 28, 2015

(30) Foreign Application Priority Data

Nov. 28, 2013 (JP) ................. 2013-246061

(51) Int. Cl.

| | |
|---|---|
| *H02H 3/06* | (2006.01) |
| *H02M 3/156* | (2006.01) |
| *H02H 7/12* | (2006.01) |
| *H02M 1/32* | (2007.01) |
| *H02H 3/087* | (2006.01) |

(52) U.S. Cl.
CPC ............. *H02M 3/156* (2013.01); *H02H 3/087* (2013.01); *H02H 7/1213* (2013.01); *H02M 1/32* (2013.01)

(58) Field of Classification Search
CPC ......... H02M 3/156; H02M 1/32; H02H 3/087; H02H 7/1213
See application file for complete search history.

(56) References Cited

U.S. PATENT DOCUMENTS

| | | | | |
|---|---|---|---|---|
| 5,734,576 A | * | 3/1998 | Klancher | ................. H02H 7/30 324/424 |
| 2009/0116161 A1 | * | 5/2009 | Takahashi | ............ H03K 17/687 361/100 |
| 2011/0279930 A1 | | 11/2011 | Lin | |
| 2012/0092897 A1 | * | 4/2012 | Hara | ....................... H02J 9/005 363/16 |

FOREIGN PATENT DOCUMENTS

| | | |
|---|---|---|
| JP | H4-038170 A | 2/1992 |
| JP | H5-92819 U | 12/1993 |
| JP | H6-233519 A | 8/1994 |
| JP | 2000-166227 A | 6/2000 |
| JP | 2007-037376 A | 2/2007 |
| JP | 2010-233323 A | 10/2010 |
| JP | 2014-003850 A | 1/2014 |

OTHER PUBLICATIONS

Office Action issued Nov. 4, 2015 in the corresponding JP application No. 2013-246061 (with English translation).

* cited by examiner

*Primary Examiner* — Thienvu Tran
*Assistant Examiner* — Tien Mai
(74) *Attorney, Agent, or Firm* — Posz Law Group, PLC

(57) ABSTRACT

A switching power supply converts an input voltage to a predetermined output voltage by controlling a switching device. The switching power supply includes a controller and a current detector. The controller controls the switching device. The current detector detects electric current flowing through the switching device. The controller starts a forced-OFF action to forcedly turn OFF the switching device when the current detected by the current detector exceeds a predetermined threshold and then ends the forced-OFF action at a start of a predetermined switching period.

10 Claims, 12 Drawing Sheets

SWITCHING POWER SUPPLY AND ELECTRONIC CONTROL UNIT

CROSS REFERENCE TO RELATED APPLICATION

This application is based on and claims priority to Japanese Patent Application No. 2013-246061 filed on Nov. 28, 2013, the contents of which are incorporated herein by reference.

TECHNICAL FIELD

The present disclosure relates to a switching power supply for converting an input voltage to a predetermined output voltage by driving and controlling a switching device and also relates to an electronic control unit having the switching power supply.

BACKGROUND

As disclosed in, for example, JP-A-2007-37376, a switching power supply generally has an overcurrent protection function to protect circuit devices from overcurrent caused by various factures. Specifically, the overcurrent protection function detects electric current flowing through a switching device and forces the switching device to be turned OFF when the detected current value exceeds a predetermined overcurrent threshold.

In this case, it is preferable that a detection error due to inrush current or noise at the time of power-on should be prevented as far as possible for the following reasons. An output stage of a switching power supply is usually connected to another power supply such as a series-regulator power supply, and an output of the other power supply is supplied to a control system such as a microcomputer. In this structure, if the overcurrent protection function is frequently activated due to a detection error caused by noise or the like, the switching device is also frequently forced to be turned OFF, so that the other power supply may be frequently stopped accordingly. As a result, the control system may stop operating.

Such a problem may be overcome by setting the overcurrent threshold to a relatively high value or by adding an overheat protection function instead of or in addition to the overcurrent protection function. The overheat protection function detects a temperature of the switching device and forces the switching device to be turned OFF when the detected temperature value exceeds a predetermined overheat threshold. However, these approaches may have the following disadvantages.

When the overcurrent threshold is set to a relatively high value, the circuit devices (e.g., diodes, inductors, capacitors, etc.) of the switching power supply need to have a current capacity higher than a current capacity required to meet specifications. Therefore, setting the overcurrent threshold to a high value unnecessarily results in an increase in size and cost of the switching power supply.

The overheat protection function can be added if the switching device and a control circuit for controlling the switching device are incorporated in a single semiconductor integrated circuit (IC). In contrast, if the switching device is added as an external device to the IC which incorporates the control circuit, it is difficult or impossible to add the overheat protection function for the following reasons.

When the switching device is incorporated in the IC together with the control circuit, characteristics of the switching device are known. Therefore, it is possible to set the overheat threshold to a suitable value according to the known characteristics. However, when the switching device is added as an external device to the IC, since characteristics of the switching device vary from product to product and cannot be identified, it is difficult to set the overheat threshold to a suitable value. For this reason, when the switching device is added as an external device to the IC, it is difficult to implement an overheat protection function.

SUMMARY

In view of the above, it is an object of the present disclosure is to provide a switching power supply and an electronic control unit having the switching power supply in which a circuit device is protected from overcurrent while a circuit connected to an output stage of the switching power supply stops operating as little as possible.

According to an aspect of the present disclosure, a switching power supply converts an input voltage to a predetermined output voltage by controlling a switching device. The switching power supply includes a controller and a current detector. The controller controls the switching device. The current detector detects electric current flowing through the switching device. The controller starts a forced-OFF action to forcedly turn OFF the switching device when the current detected by the current detector exceeds a predetermined threshold and then ends the forced-OFF action at a start of a predetermined switching period.

Thus, even when the threshold used to determine whether an overcurrent condition occurs is set to a relatively small value (e.g., minimum value considered acceptable in view of specifications related to currents in the switching power supply), occurrence of a situation where a circuit connected to an output stage of the switching power supply stops operating can be reduced or avoided. This is because even when the controller starts the forced-OFF action due to inrush current or noise, the controller ends the forced-OFF action at the start of the switching period so that the switching device can be driven normally.

Therefore, even when the overcurrent condition is detected due to noise or the like, an output to the circuit connected to the output stage of the switching power supply is not completely stopped, and it returns to normal at a predetermined time later. Then, when the inrush current or the noise disappears, the control returns to normal. Thus, circuit devices of the switching power supply can have the minimum characteristics (e.g., electric current capability) necessary to satisfy specifications of the switching power supply.

Further, when the overcurrent condition occurs due to some failure, the forced-OFF action is repeatedly executed. Thus, since the overcurrent condition does not continue, the circuit devices can be protected from overcurrent. In this way, in the switching power supply, the circuit devices are protected from overcurrent while the circuit, which is connected the output stage of the switching power supply, stops operating as little as possible.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
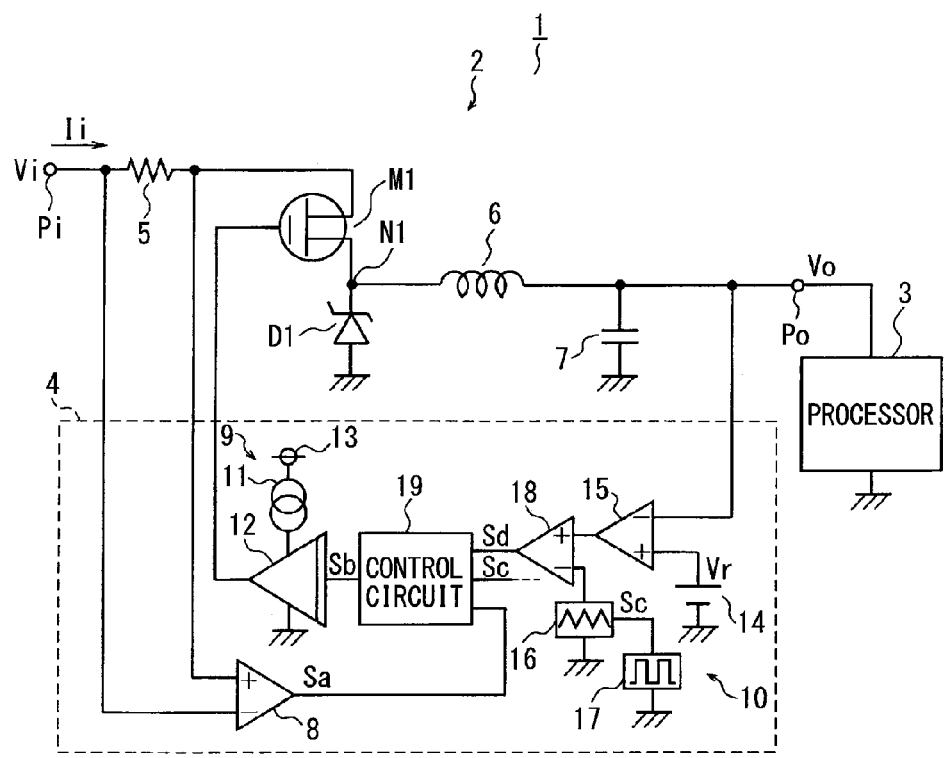
FIG. 1 is a schematic diagram of an electronic control unit having a switching power supply according to a first embodiment of the present disclosure.

Embodiments of the present disclosure are described below with reference to the drawings. Throughout the embodiments, like characters of reference indicate the same or equivalent parts.

First Embodiment

A first embodiment of the present disclosure is described below with reference to FIGS. 1-3.

An electronic control unit (ECU) 1 is mounted on a vehicle such as an automobile and includes a switching power supply 2 and a control processor 3.

The switching power supply 2 is a step-down switching power supply device. The control processor 3 is connected to an output stage of the switching power supply 2. An output voltage Vo of the switching power supply 2 is supplied to the control processor 3. The control processor 3 operates on power supplied from the switching power supply 2 and performs a predetermined control process. For example, the control processor 3 includes a series-regulator power supply circuit and a control section such as a microcomputer which operates on power supplied from the series-regulator power supply circuit. The switching power supply 2 includes a drive controller 4, a transistor M1, a shunt resistor 5, a diode D1, an inductor 6, and a capacitor 7. The drive controller 4 corresponds to a controller recited in claims. The transistor M1 corresponds to a switching device recited in claims.

The drive controller 4 drives the transistor M1 by pulse width modulation (PWM) control, thereby stepping down an input voltage Vi supplied through a power supply input terminal Pi from a battery (not shown) mounted on the vehicle. An output voltage of the drive controller 4 is supplied through a power supply output terminal Po to a circuit connected to an output stage of the drive controller 4. The drive controller 4 is implemented as a semiconductor integrated circuit (IC).

The transistor M1 is an N-channel MOS transistor. A drain of the transistor M1 is connected through the power supply input terminal Pi to the shunt resistor 5. A source of the transistor M1 is connected to a node N1. A gate of the transistor M1 is supplied with a drive signal from the drive controller 4.

The diode D1 is a freewheeling diode and can be a Schottky barrier diode, for example. The diode D1 is connected between the node N1 and a ground potential (i.e., a circuit reference potential) in such a manner that an anode of the diode D1 is connected to the ground potential. For example, the ground potential is 0V. The inductor 6 is a smoothing inductor and connected between the node N1 and the power supply output terminal Po. The capacitor 7 is a smoothing capacitor and connected between the power supply output terminal Po and the ground potential.

The drive controller 4 includes an overcurrent detection circuit 8, a drive circuit 9, and a voltage control circuit 10. The overcurrent detection circuit 8 corresponds to a current detector recited in claims. The overcurrent detection circuit 8 has a comparator to which a voltage across the shunt resistor 5 is inputted. Based on the voltage across the shunt resistor 5, the overcurrent detection circuit 8 detects whether an input current Ii to the switching power supply 2 exceeds an overcurrent detection threshold Th, i.e., detects whether an overcurrent condition occurs. The input current Ii corresponds to a current flowing through the transistor M1.

Specifically, when the voltage across the shunt resistor 5 is not greater than a predetermined determination value, the overcurrent detection circuit 8 outputs a current detection signal Sa having a first level indicating that the overcurrent condition does not occur. In contrast, when the voltage across the shunt resistor 5 is greater than the determination value, the overcurrent detection circuit 8 outputs a current detection signal Sa having a second level indicating that the overcurrent condition occurs. For example, the first level is a high level, and the second level is a low level. The determination value is set to a value corresponding to the voltage across the shunt resistor 5 observed when the input current Ii reaches the overcurrent detection threshold Th. The current detection signal Sa outputted from the overcurrent detection circuit 8 is supplied to the voltage control circuit 10.

The drive circuit 9 turns ON and OFF the transistor M1 in accordance with a control signal (i.e., duty signal) Sb supplied from the voltage control circuit 10. Specifically, the drive circuit 9 keeps the transistor M1 ON during a period of time the control signal Sb has a high level and keeps the transistor M1 OFF during a period of time where the control signal has a low level.

The drive circuit 9 includes a current source 11 and a driver 12. The current source 11 is supplied with power from a power supply terminal 13 and outputs a drive current. Although not shown in the drawings, an output stage of the driver 12 is provided with a push-pull circuit constructed with two switching devices: high-side and low-side switching devices. When the high-side switching device is turned ON, the drive current outputted from the current source 11 is supplied to the gate of the transistor M1. Accordingly, a gate capacitance of the transistor M1 is charged, a gate voltage of the transistor M1 increases, and the transistor M1 is turned ON. In contrast, when the low-side switching device is turned ON, a current discharge path from the gate of the transistor M1 to the ground potential is created. Accordingly, the gate capacitance of the transistor M1 is discharged, the gate voltage of the transistor M1 decreases, and the transistor M1 is turned OFF.

The voltage control circuit 10 changes a duty ratio of the control signal Sb outputted to the drive circuit 9 based on a difference between a target value of the output voltage Vo and a feedback value of the output voltage Vo so that the output voltage Vo can be equal to the target value. The voltage control circuit 10 includes a reference voltage generation circuit 14, an error amplifier 15, a triangle wave signal generation circuit 16, an oscillator 17, a comparator 18, and a control circuit 19.

The reference voltage generation circuit 14 generates a reference voltage Vr equal to or depending on the target value of the output voltage Vo. For example, the reference voltage generation circuit 14 is a bandgap reference circuit. The output voltage Vo or a divisional voltage generated by dividing the output voltage Vo in a predetermined ratio is inputted (i.e., fed back) to an inverting input terminal of the error amplifier 15. The output voltage Vo or the divisional voltage inputted to the inverting input terminal of the error amplifier 15 is hereinafter sometimes referred to as the "feedback voltage". The reference voltage Vr is inputted to a non-inverting input terminal of the error amplifier 15. The error amplifier 15 outputs an error signal by amplifying a difference between the feedback voltage and the reference voltage Vr.

The triangle wave signal generation circuit 16 generates a triangle wave signal (i.e., PWM carrier signal) having a frequency (e.g., 400 kHz) according to a PWM period (i.e., switching period) based on an oscillation signal Sc (i.e., clock signal) supplied from the oscillator 17. The error signal outputted from the error amplifier 15 is inputted to a non-inverting input terminal of the comparator 18. The triangle wave signal outputted from the triangle wave signal generation circuit 16 is inputted to an inverting input terminal of the comparator 18. Thus, an output signal Sd of the comparator 18 changes synchronously with the triangle wave signal according to a result of a comparison between the feedback voltage and the reference voltage Vr. Specifically, the output signal Sd of the comparator 18 has a low level during a period of time where the feedback voltage is greater than the reference voltage Vr and has a high level during a period of time where the feedback voltage is less than the reference voltage Vr.

The control circuit 19 includes a logic circuit, a counter, and a timer. The control circuit 19 is supplied with the current detection signal Sa, the oscillation signal Sc, and the output signal Sd of the comparator 18. The counter and the timer operate synchronously with the oscillation signal Sc. The control circuit 19 performs a determination process to determine whether the overcurrent condition is detected based on the level of the current detection signal Sa and changes a content of control according to a result of the determination process. It is noted that the control circuit 19 performs the determination process during a period of time where the transistor M1 is ON, i.e., where the output signal Sd of the comparator 18 has a high level.

Specifically, when the current detection signal Sa has a high level, the control circuit 19 outputs the output signal Sd of the comparator 18 as the control signal Sb. Accordingly, a voltage feedback control is performed normally. This voltage feedback control corresponds to a normal control recited in claims. In contrast, when the current detection signal Sa has a low level, the control circuit 19 performs the following control.

When detecting that the current detection signal Sa has a low level, the control circuit 19 clamps the control signal Sb to a low level. Thus, the transistor M1 is forced to be turned OFF regardless of the voltage feedback control. This action executed by the control circuit 19 to force the transistor M1 to be turned OFF is hereinafter sometimes referred to as the "forced-OFF action". Then, when the oscillation signal Sc rises firstly (i.e., at a start of the switching period), the control circuit 19 releases the clamping of the control signal Sb and outputs the output signal Sd as the control signal Sb. Thus, the control circuit 19 stops the forced-OFF action so that the transistor M1 can be driven normally.

It is noted that when the control circuit 19 repeats the forced-OFF action a predetermined number of times (e.g., four times), the control circuit 19 continues the forced-OFF action without ending the forced-OFF action. According to the first embodiment, the predetermined number is four. The number of times the forced-OFF action is repeated is counted by the counter of the control circuit 19. Then, when an accumulated value of the counter reaches four, the control circuit 19 continues the forced-OFF action without ending the forced-OFF action. The counter is incremented when the clamping of the control signal Sb is released. In other words, the counter is incremented at the start of the first switching period after the forced-OFF action is started.

Next, a concrete operation of the control circuit 19 is described below with reference to FIG. 2. When the ECU 1 is powered ON, the control circuit 19 is activated at S1, and the counter of the control circuit 19 is initialized at S2 so that a count value cnt of the counter can be cleared to zero. Then, at S3, the control circuit 19 determines whether the current detection signal Sa has a low level. If the current detection signal Sa has a high level, i.e., does not have a low level, corresponding to NO at S3, the control circuit 19 outputs the output signal Sd as the control signal Sb at S4 so that the transistor M1 can be driven normally. After S4, the control circuit 19 returns to S3.

In contrast, if the current detection signal Sa has a low level corresponding to YES at S3, the control circuit 19 clamps the output signal Sd to a low level at S5 so that the transistor M1 can forced to be turned OFF. That is, at S5, the control circuit 19 starts the forced-OFF action. Then, at S4, the control circuit 19 increments the counter by one at the rising edge of the oscillation signal Sc appearing for the first time after the forced-OFF action is started. Then, at S7, the control circuit 19 determines whether the count value cnt is not less than four as the predetermined number.

If the count value cnt is less than four corresponding to NO at S7, the control circuit 19 releases the clamping of the control signal Sb at S8 so that the transistor M1 can be driven normally. That, at S8, the control circuit 19 stops the forced-OFF action. After S8, the control circuit 19 returns to S3. In contrast, if the count value cnt is not less than four corresponding to YES at S7, the control circuit 19 ends the operation while continuing to clamp the control signal Sb to a low level, i.e., while continuing the forced-OFF action.

Next, an overcurrent protection function achieved by a structure described above is explained with reference to a timing diagram shown in FIG. 3. For example, when the input current Ii increases above the overcurrent detection threshold Th due to inrush current or noise, the current detection signal Sa changes to a low level at a time t1. As a result, the control signal Sb is clamped to a low level, and the transistor M1 is forced to be turned OFF. Then, the counter is incremented at a time t2 when the oscillation signal Sc rises firstly after that. Since the count value cnt is one, i.e., less than four at this time, the clamping of the control signal Sb is released.

However, since the input current Ii is still above the overcurrent detection threshold Th (i.e., the current detection signal Sa has a low level) as of this point in time, the control signal Sb is clamped to a low level again at a time t3 so that the transistor M1 can be forced to be turned OFF. Then, the counter is incremented at a time t4 when the oscillation signal Sc rises firstly after that. Since the count value cnt is two, i.e., less than four at this time, the clamping of the control signal Sb is released.

Since the input current Ii is not greater than the overcurrent detection threshold Th (i.e., the current detection signal Sa has a high level) as of this point in time, the output signal Sd of the comparator 18 is outputted as the control signal Sd so that the transistor M1 can be driven normally. In this way, the count value cnt of the counter is retained (i.e., cnt=2) during a period of time from the time t4 to a time t5 where the transistor M1 is driven normally.

Then, when the input current Ii increases above the overcurrent detection threshold Th due to some failure, the current detection signal Sa changes to a low level at a time t5. As a result, the control signal Sb is clamped to a low level, and the transistor M1 is forced to be turned OFF. Then, the counter is incremented at a time t6 when the oscillation signal Sc rises firstly after that. Since the count value cnt is three, i.e., less than four at this time, the clamping of the control signal Sb is released at a time t7.

In this case, the input current Ii remains in the overcurrent condition until the failure is removed. Therefore, as described above, the execution and release of the clamping of the control signal Sb is repeated, i.e., the start and end of the forced-OFF action is repeated. Then, when the count value cnt of the counter reaches four at a time t8, the release of the clamping of the control signal Sb is prohibited so that the transistor M1 can remain forced to be OFF. Then, the count value cnt of the counter is cleared to zero at a time t9 when the oscillation signal Sc rises firstly after the counter value cnt reaches four. It is noted that the clear of the count value cnt at the time t9 is optional.

As described above, according to the first embodiment, the switching power supply 2 is configured such that when the input current Ii exceeds the overcurrent detection threshold Th, the forced-OFF action to force the transistor M1 to be turned OFF is started. The forced-OFF action is ended at the start of a next switching period. Thus, even when the determination value used to determine whether the overcurrent condition occurs is set to a relatively small value (e.g., minimum value set in consideration of specifications related to currents in the switching power supply 2), occurrence of a situation where the control processor 3, which is connected to the switching power supply 2, stops operating can be reduced or avoided for reasons below.

That is, even when the forced-OFF action is started due to inrush current or noise, the forced-OFF action is ended at the start of the next switching period so that the transistor M1 can be driven normally. Therefore, even when the overcurrent condition is detected due to noise or the like, an output to the circuit connected to the output stage of the switching power supply 2 is not completely stopped, and it returns to normal at a predetermined time later. Then, when the inrush current or the noise disappears, the control returns to normal. Thus, the circuit devices including the transistor M1, the diode D1, the inductor 6, and the capacitor 7 can have the minimum characteristics (e.g., electric current capability) necessary to satisfy specifications of the switching power supply 2.

Further, according to the first embodiment, when the overcurrent condition occurs due to some failures, the forced-OFF action is repeatedly executed. Thus, since the overcurrent condition does not continue, the circuit devices can be protected from overcurrent. In this way, in the switching power supply 2, the circuit devices are protected from overcurrent while the control processor 3, which is connected the output stage of the switching power supply 2, stops operating as little as possible. Furthermore, the forced-OFF action is ended at the start of the switching period for just after the forced-OFF action is started. In such an approach, even when the overcurrent condition is detected incorrectly due to noise or the like, a period of time where the output of the switching power supply 2 to the control processor 3 is stopped can be minimized.

Further, according to the first embodiment, when the number of times the forced-OFF action is executed reaches the predetermined number, the forced-OFF action is continued without being ended. It is noted that since an overcurrent condition caused by noise or the like is temporary and does not last, the forced-OFF action is not repeated. In contrast, an overcurrent condition caused by some failure (i.e., an overcurrent condition to be detected) lasts until the failure is corrected. Accordingly, in this case, the forced-OFF action is executed repeatedly, and when the number of times the forced-OFF action is executed reaches the predetermined number, the forced-OFF action is continued.

Thus, when the overcurrent condition occurs and lasts, the forced-OFF action is continuously executed, so that the circuit devices can be surely protected from overcurrent. In the event of such an overcurrent condition, to stop driving the transistor M1 as a switching device is desirable from the viewpoint of safety, although the output to the control processor 3 connected to the output stage of the switching power supply 2 is stopped. For this reason, according to the first embodiment, when the overcurrent condition lasts, the forced-OFF action is continued so that safety of the switching power supply 2 and, by extension, the ECU 1 can be improved.

The total number of times the forced-OFF action is executed is counted by the counter of the control circuit 19. In such an approach, even when an overcurrent condition lasting for a short time occurs periodically due to some failure, the forced-OFF action is continued after the total number counted by the counter reaches a predetermined number. Thus, even in the event of such failure, the circuit devices can be suitably protected from overcurrent.

The drive controller 4 is implemented as a semiconductor integrated circuit (IC), and the transistor M1 is added as an external device to the IC and located outside the IC. One advantage of this structure is that a transistor having good characteristics (e.g., ON resistance) can be employed as the transistor M1. Another advantage of this structure is that heat generation in the switching power supply 2 is distributed between the IC and the transistor M1, so that heat generation in the IC is reduced accordingly. It is noted that as described in the background section, when a switching device is added as an external device to an IC, it is difficult to implement an overheat protection function. However, according to the first embodiment, the circuit devices are suitably protected from overcurrent without an overheat protection function while the control processor 3, which is connected the output stage of the switching power supply 2, stops operating as little as possible. Therefore, the above advantages can be maximized.

Second Embodiment

A second embodiment is described below with reference to FIGS. 4 and 5. According to the second embodiment, when the counter is incremented a predetermined number of times (e.g., four times) in a row, the control circuit 19 continues the forced-OFF action without ending it. A concrete operation of the control circuit 19 according to the second embodiment is described below with reference to FIG. 4.

Figure 4:
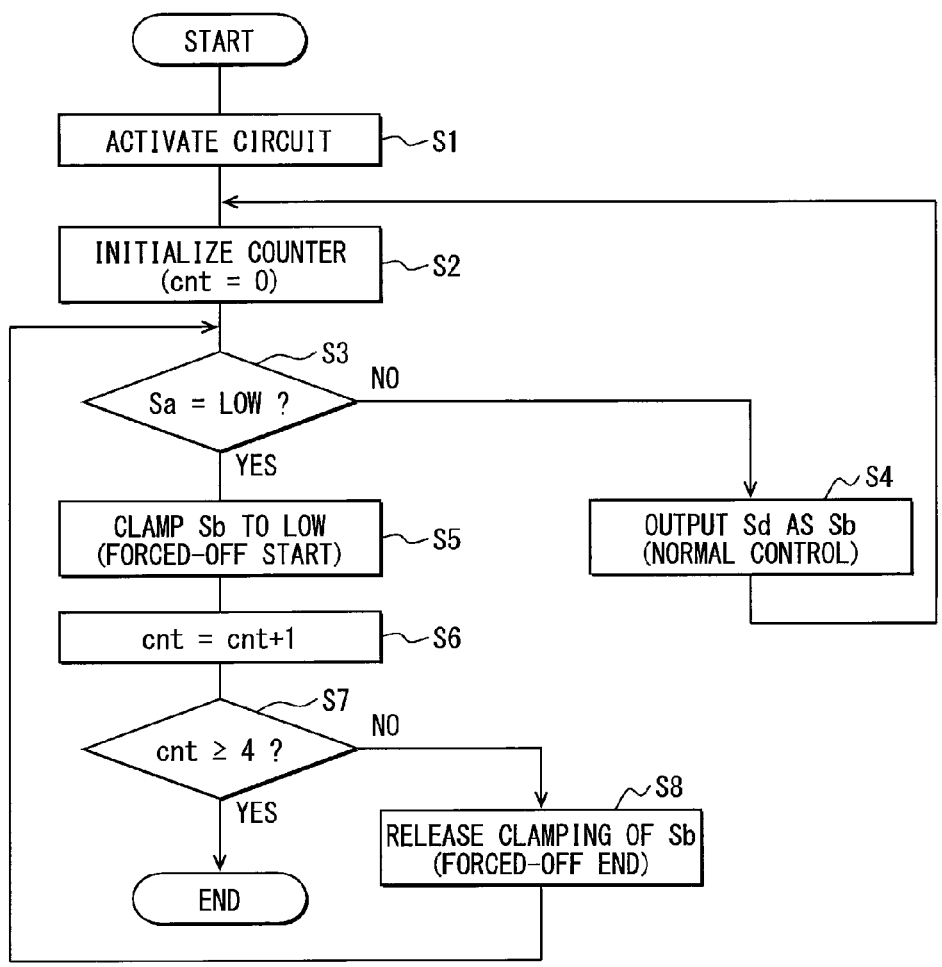
FIG. 4 is a flowchart of a control process related to an overcurrent detection function according to a second embodiment of the present disclosure.
Figure 5:
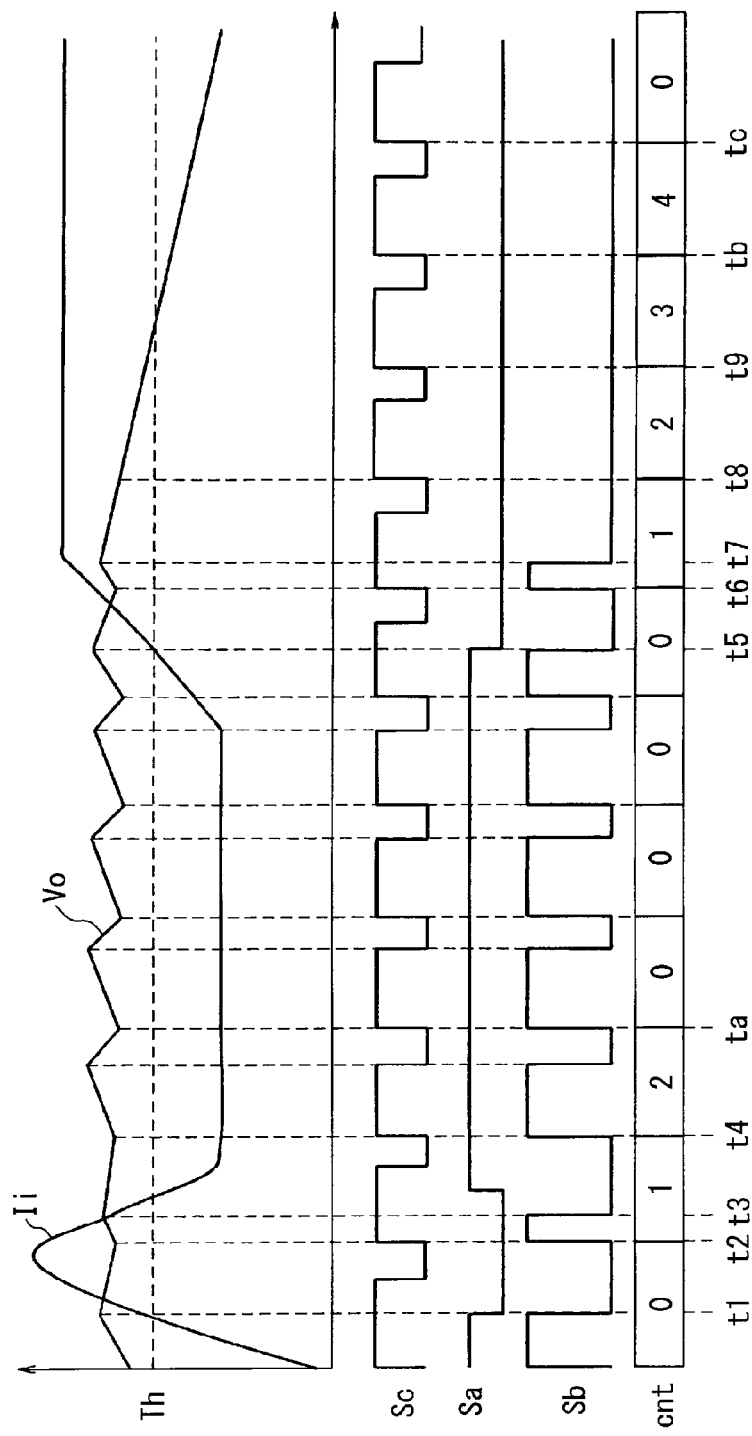
FIG. 5 is a timing diagram of a switching power supply according to the second embodiment.

As shown in FIG. 4, after S4, the operation returns to S2 instead of proceeding to S3. That is, like in the first embodiment, the count value cnt of the counter is incremented each time the overcurrent condition is detected (i.e., the forced-OFF action is executed). However, unlike in the first embodiment, the count value cnt is cleared when the overcurrent condition becomes undetected.

Next, an overcurrent protection function achieved by a structure described above is explained with reference to a timing diagram shown in FIG. 5. As shown in FIG. 5, according to the second embodiment, the count value cnt is cleared to zero at a time to when the oscillation signal Sc rises firstly after the overcurrent condition is removed once. Therefore, when the input current Ii increases above the overcurrent detection threshold Th again, the number of times the forced-OFF action is executed is recounted from zero. Then, the count value cnt reaches four at a time tb when the forced-OFF action is executed four times in a row, specifically, when the start and end of the forced-OFF action is repeated four times in a row.

Accordingly, the release of the clamping of the control signal Sb is prohibited so that the transistor M1 can remain forced to be OFF. Then, the count value cnt is cleared to zero at a time tc when the oscillation signal Sc rises firstly after the counter value cnt reaches four. It is noted that the clear of the count value cnt at the time tc is optional.

The same effect and advantage as obtained in the first embodiment can be obtained in the second embodiment. Further, according to the second embodiment, the number of times the forced-OFF action is executed in a row is counted by the counter. Thus, detection errors caused by noise or the like lasting for a relatively long period of time can be prevented.

Third Embodiment

A third embodiment is described below with reference to FIGS. 6 and 7. According to the third embodiment, when a total execution time for which the forced-OFF action is executed in total reaches a predetermined time (e.g., 10 μs), the control circuit 19 continues the forced-OFF action without ending it. The total execution time is measured by the timer of the control circuit 19. That is, the control circuit 19 continues the forced-OFF action without ending it, when the total execution time measured by the timer reaches 10 μs. A concrete operation of the control circuit 19 according to the third embodiment is described below with reference to FIG. 6.

Figure 2:
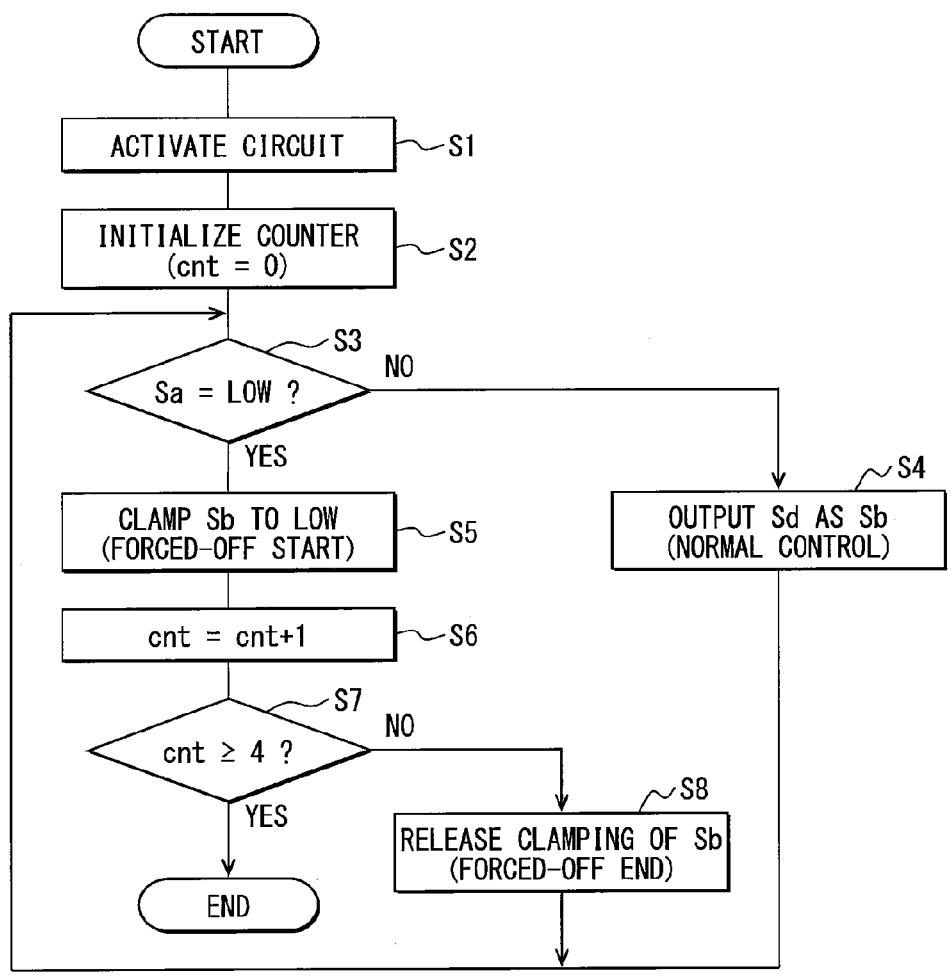
FIG. 2 is a flowchart of a control process related to an overcurrent detection function according to the first embodiment.
Figure 3:
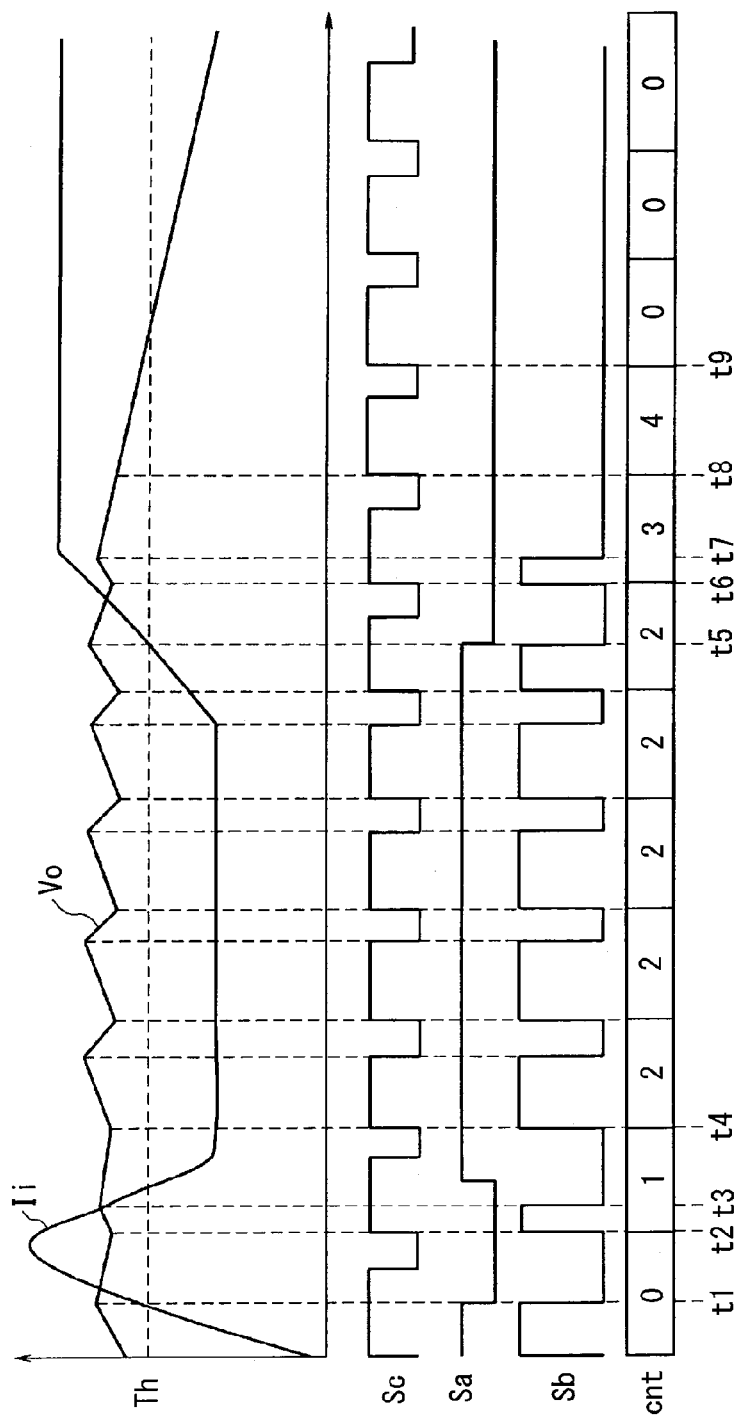
FIG. 3 is a timing diagram of the switching power supply according to the first embodiment.
Figure 6:
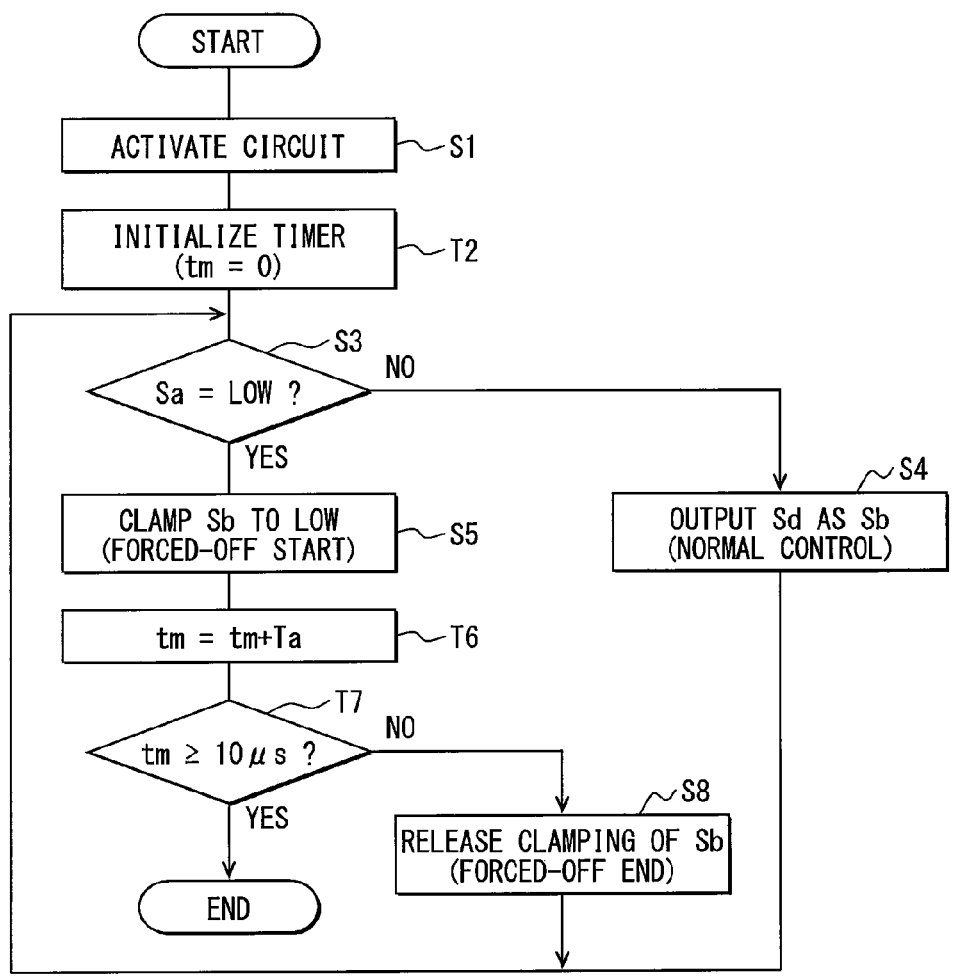
FIG. 6 is a flowchart of a control process related to an overcurrent detection function according to a third embodiment of the present disclosure.
Figure 7:
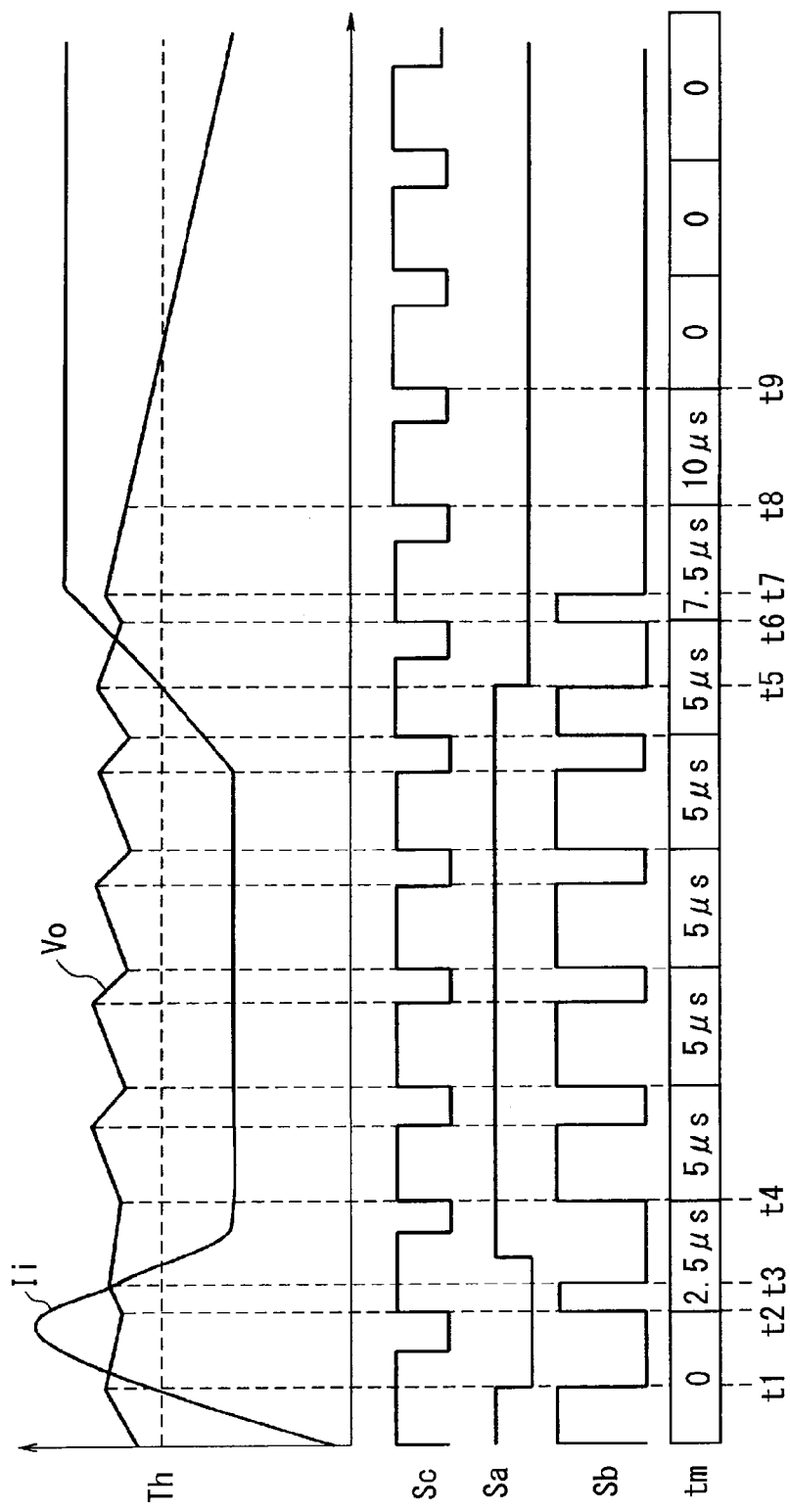
FIG. 7 is a timing diagram of a switching power supply according to the third embodiment.

The flowchart of FIG. 6 differs from the flowchart of FIG. 2 in that T2, T6, and T7 replace S2, S6, and S7. At T2, a measured time tm of the timer is cleared (i.e., initialized) to zero. At T6, a predetermined time Ta (e.g., 2.5 μs) corresponding to one switching period is added to the measured time tm (i.e., tm=tm+Ta).

At S7, it is determined whether the measured time tm is not less than 10 μs. If the measured time tm is less than 10 μs corresponding to NO at T7, the operation proceeds to S8 where the clamping of the control signal Sb is released. In contrast, if the measured time tm is not less than 10 μs corresponding to YES at T7, the control circuit 19 ends the operation while continuing to clamp the control signal Sb to a low level, i.e., while continuing the forced-OFF action.

Next, an overcurrent protection function achieved by a structure described above is explained with reference to a timing diagram shown in FIG. 7. The third embodiment differs from the first embodiment only in that when the counter is incremented in the first embodiment, the predetermined time Ta (2.5 μs) is added to the measured time tm of the timer in the third embodiment. Therefore, the same effect and advantage as obtained in the first embodiment can be obtained in the third embodiment.

Fourth Embodiment

A fourth embodiment is described below with reference to FIGS. 8 and 9. According to the fourth embodiment, when a continuous execution time for which the forced-OFF action is executed continuously reaches a predetermined time (e.g., 10 μs), the control circuit 19 continues the forced-OFF action without ending it. The continuous execution time is measured by the timer of the control circuit 19. A concrete operation of the control circuit 19 according to the fourth embodiment is described below with reference to FIG. 8.

Figure 8:
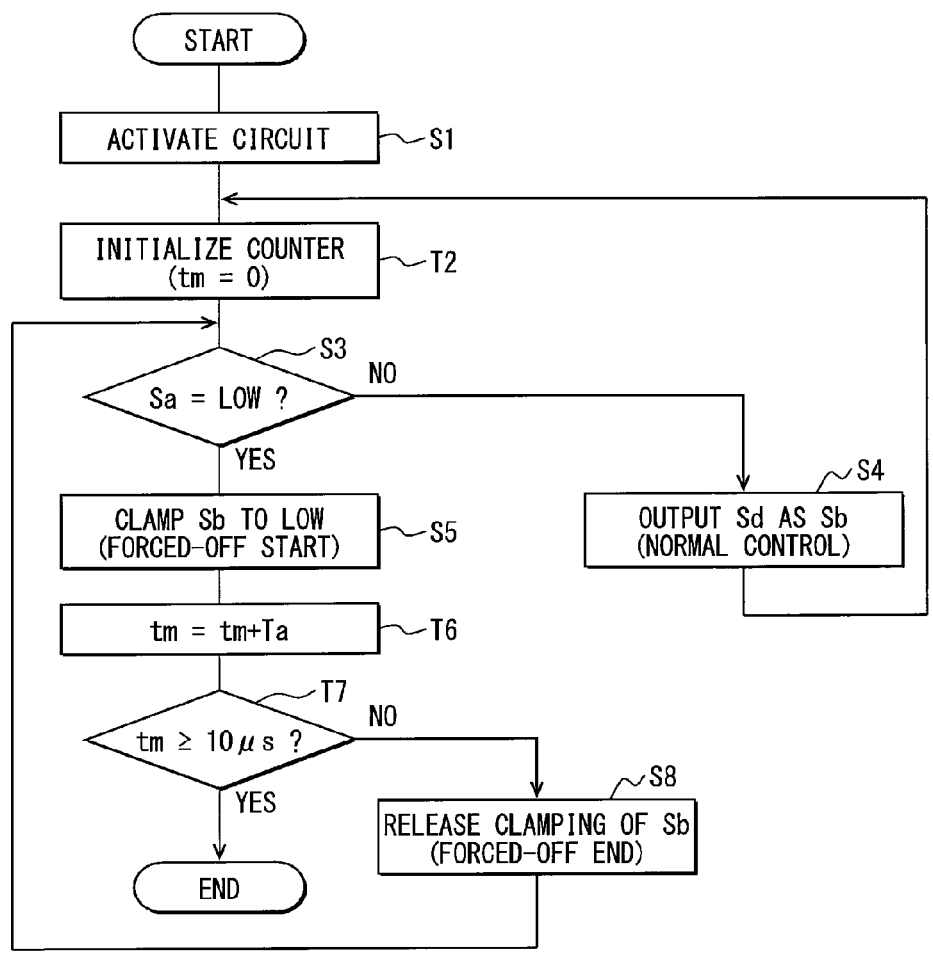
FIG. 8 is a flowchart of a control process related to an overcurrent detection function according to a fourth embodiment of the present disclosure.
Figure 9:
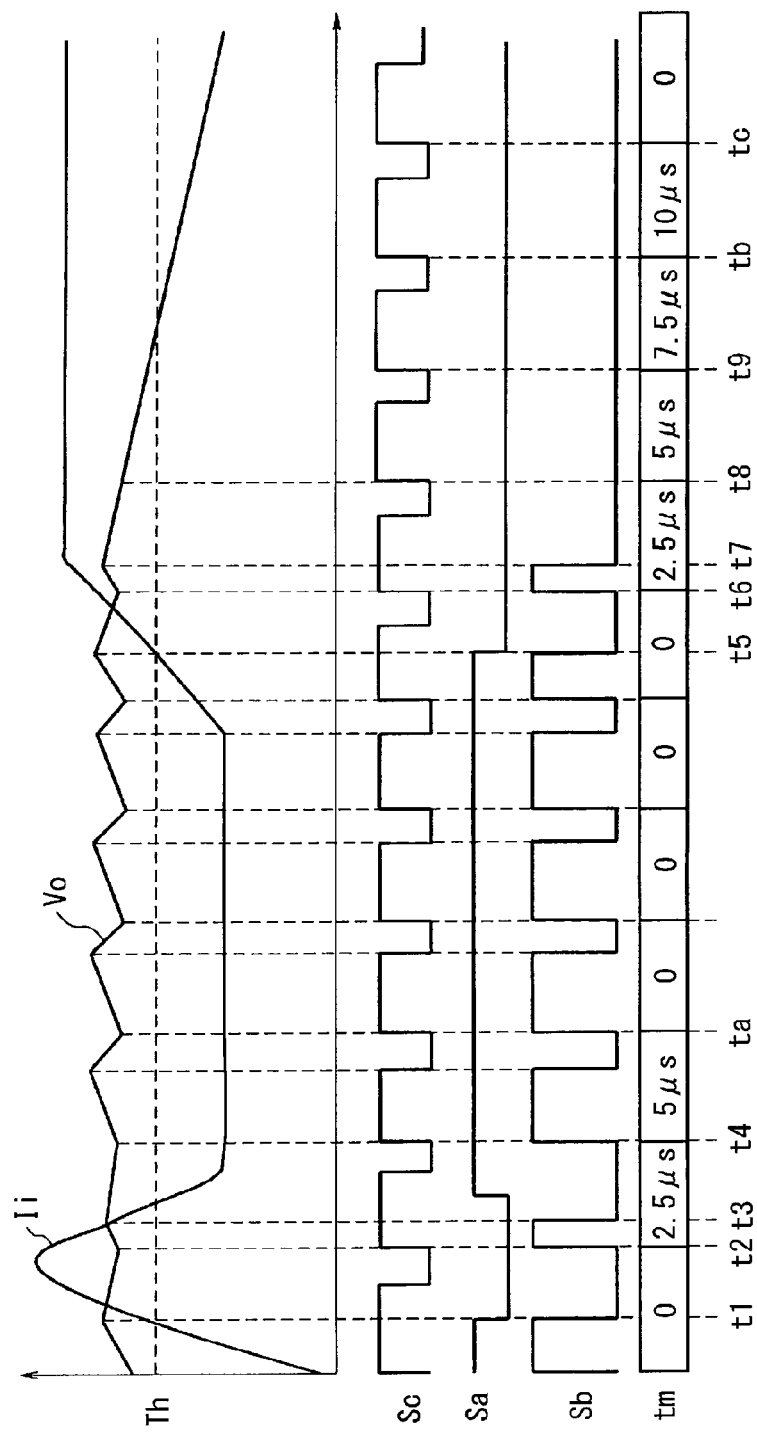
FIG. 9 is a timing diagram of a switching power supply according to the fourth embodiment.

As shown in FIG. 8, after S4, the operation returns to S2 instead of proceeding to S3. That is, like in the third embodiment, the measured time tm of the timer is incremented each time the overcurrent condition is detected (i.e., the forced-OFF action is executed). However, unlike in the third embodiment, the measured time tm is cleared when the overcurrent condition becomes undetected.

Next, an overcurrent protection function achieved by a structure described above is explained with reference to a timing diagram shown in FIG. 9. As shown in FIG. 9, according to the fourth embodiment, the measured time tm of the timer is cleared to zero at a time to when the oscillation signal Sc rises firstly after the overcurrent condition is removed once (i.e., after a time t4). Therefore, when the input current Ii increases above the overcurrent detection threshold Th again, the total execution time, for which the forced-OFF action is executed, is remeasured from zero. Then, when the forced-OFF action is executed in succession, and the measured time tm reaches 10 μm at a time tb, the release of the clamping of the control signal Sb is prohibited so that the transistor M1 can remain forced to be OFF. Thus, the same effect and advantage as obtained in the third embodiment can be obtained in the fourth embodiment.

Fifth Embodiment

A fifth embodiment is described below with reference to FIG. 10.

In the preceding embodiments, the input current Ii to the switching power supply 2 is detected, and when the detected input current Ii exceeds the overcurrent detection threshold Th, the forced-OFF action is started so that the transistor M1 can be forced to be turned OFF. In contrast, in the fifth embodiment, an output current Io from a switching power supply 21 is detected, and when the detected output current Io exceeds an overcurrent detection threshold Th, the forced-OFF action is started so that the transistor M1 can be forced to be turned OFF.

Figure 10:
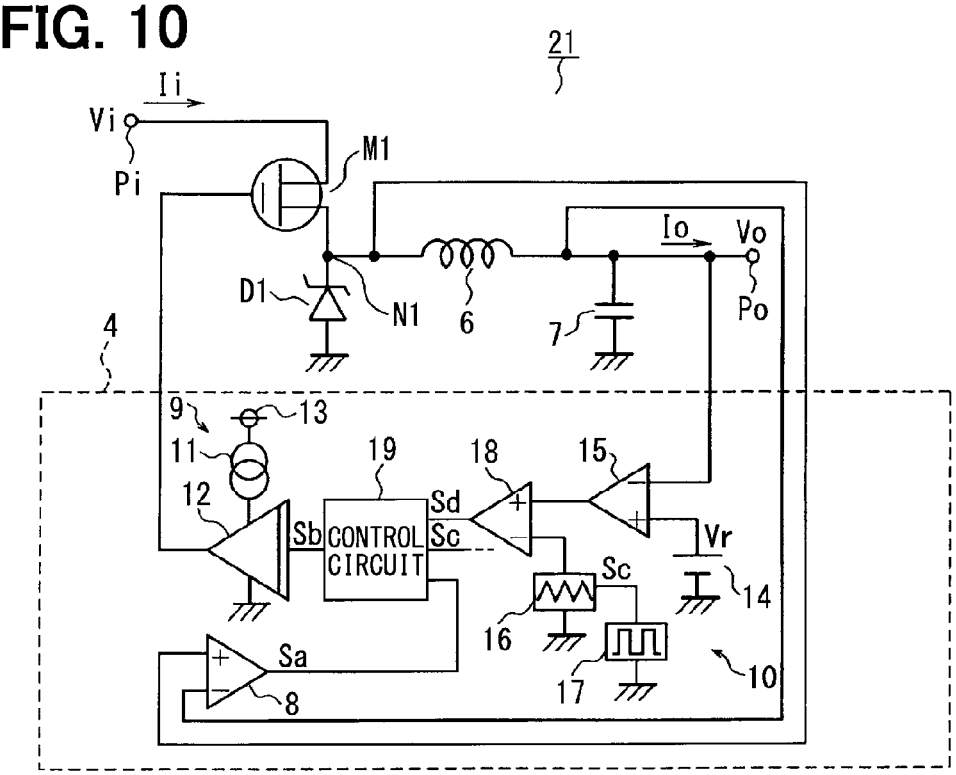
FIG. 10 is a schematic diagram of a switching power supply according to a fifth embodiment of the present disclosure.

As shown in FIG. 10, the switching power supply 21 differs from the switching power supply 2 shown in FIG. 1 in that it does not have the shunt resistor 5 and that a voltage across the inductor 6 instead of the voltage across the shunt resistor 5 is inputted to the overcurrent detection circuit 8. In this case, the overcurrent detection circuit 8 detects whether the output current Io of the switching power supply 21 exceeds the overcurrent detection threshold Th based on the voltage across the inductor 6. The output current Io corresponds to a current flowing through the transistor M1.

Specifically, when the voltage across the inductor 6 is not greater than a predetermined determination value, the overcurrent detection circuit 8 outputs a current detection signal Sa having a first level indicating that the overcurrent condition does not occur. In contrast, when the voltage across the inductor 6 is greater than the determination value, the overcurrent detection circuit 8 outputs a current detection signal Sa having a second level indicating that the overcurrent condition occurs. For example, the first level is a high level, and the second level is a low level. The determination value is set to a value corresponding to the voltage across the inductor 6 observed when the output current Io reaches the overcurrent detection threshold Th.

As described above, according to the fifth embodiment, the output current Io instead of the input current Ii is detected, and when the detected output current Io exceeds the overcurrent detection threshold Th, the forced-OFF action is started so that the transistor M1 can be forced to be turned OFF. Thus, the same effect and advantage as obtained in the preceding embodiments can be obtained in the fifth embodiment. Further, since the current detection is made using a resistive component of the inductor 6, a resistor for current detection purpose can be omitted.

Sixth Embodiment

Figure 11:
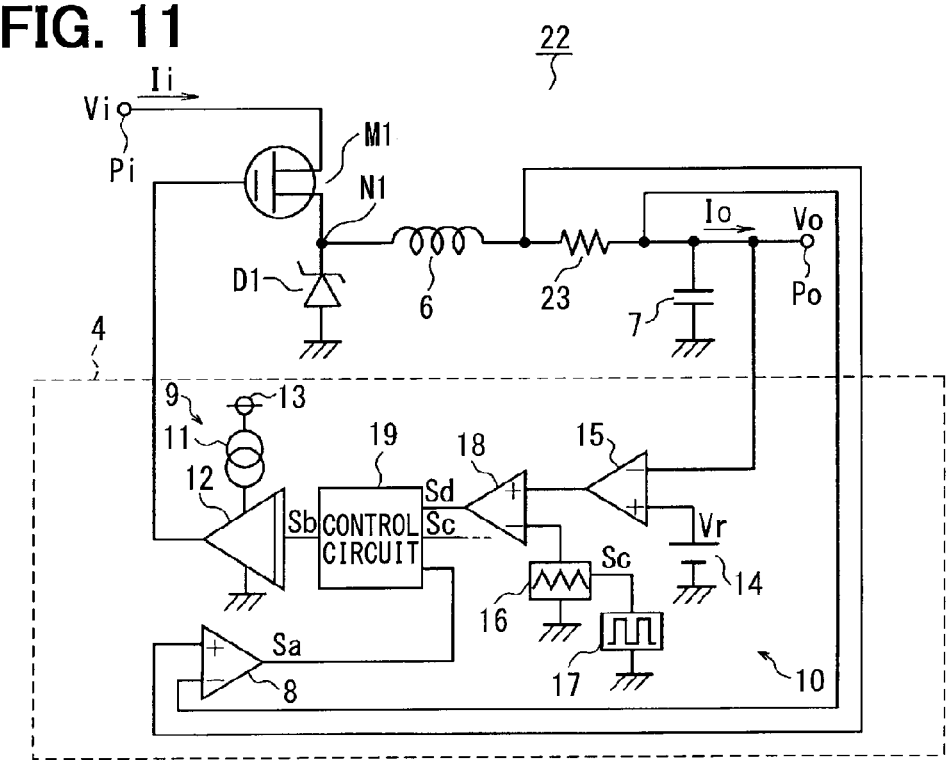
FIG. 11 is a schematic diagram of a switching power supply according to a sixth embodiment of the present disclosure.

A sixth embodiment is described below with reference to FIG. 11. As shown in FIG. 11, a switching power supply 22 according to the sixth embodiment is similar to but differs from the switching power supply 21 shown in FIG. 10 in that it has an additional shunt resistor 23 and that a voltage across the shunt resistor 23 instead of the voltage across the inductor 6 is inputted to the overcurrent detection circuit 8. The shunt resistor 23 is connected in series between the inductor 6 and the power supply output terminal Po.

In this case, like in the fifth embodiment, the overcurrent detection circuit 8 detects whether the output current Io of the switching power supply 22 exceeds the overcurrent detection threshold Th based on the voltage across the shunt resistor 23. Thus, the same effect and advantage as obtained in the fifth embodiment can be obtained in the sixth embodiment. Further, since the current detection is made using the shunt resistor 23 for current detection purpose, accuracy of the current detection can be improved.

Seventh Embodiment

A seventh embodiment is described below with reference to FIG. 12.

In the preceding embodiments, the switching power supply is a step-down switching power supply. However, the overcurrent protection function according to the present disclosure can be applied to various types of switching power supplies including a step-up switching power supply, a step-up and step-down switching power supply, and an inverting switching power supply. As an example, a switching power supply 31 according to the seventh embodiment is a step-up switching power supply.

Figure 12:
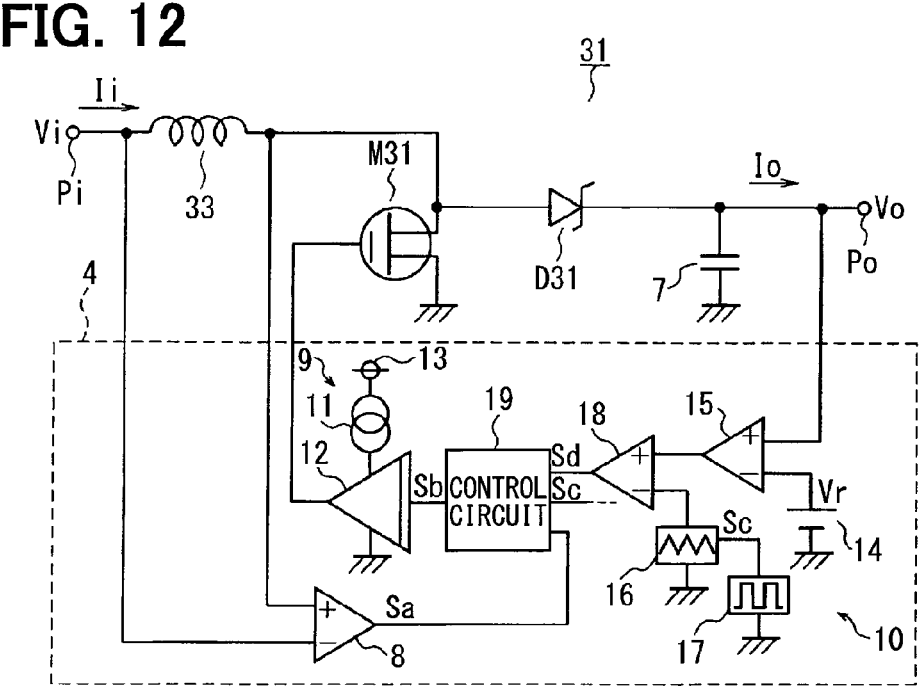
FIG. 12 is a schematic diagram of a switching power supply according to a seventh embodiment of the present disclosure.

As shown in FIG. 12, the switching power supply 31 includes the drive controller 4, a transistor M31, an inductor 33, and a diode D31. The transistor M31 is an N-channel MOS transistor. The diode D31 is a Schottky barrier diode. The transistor M31 corresponds to a switching device recited in claims.

A drain of the transistor M31 is connected to the power supply input terminal Pi through the inductor 33 and also connected to the power supply output terminal Po through the diode D31 in a forward direction. A source of the transistor M31 is connected to the ground potential. In this case, the overcurrent detection circuit 8 detects whether an input current Ii to the switching power supply 31 exceeds an overcurrent detection threshold Th based on a voltage across the inductor 33. Since the switching power supply 31 is a step-up switching power supply, voltages applied to the input terminals of the error amplifier 15 are reversed compared to those in the preceding embodiments.

Thus, the same effect and advantage as obtained in the preceding embodiments can be obtained in the sixth embodiment. In an example shown in FIG. 12, there is no shunt resistor for current detection purpose. Accordingly, the cost and size of the switching power supply 31 can be reduced. Alternatively, the switching power supply 31 can include a shunt resistor for current detection purpose. In this case, the shunt resistor is connected in series between the power supply input terminal Pi and the drain of the transistor M31, and the overcurrent detection circuit 8 detects whether the input current Ii exceeds the overcurrent detection threshold Th based on a voltage across the shunt resistor. In such an approach, the accuracy of the current detection can be improved.

Seventh Embodiment

Figure 13:
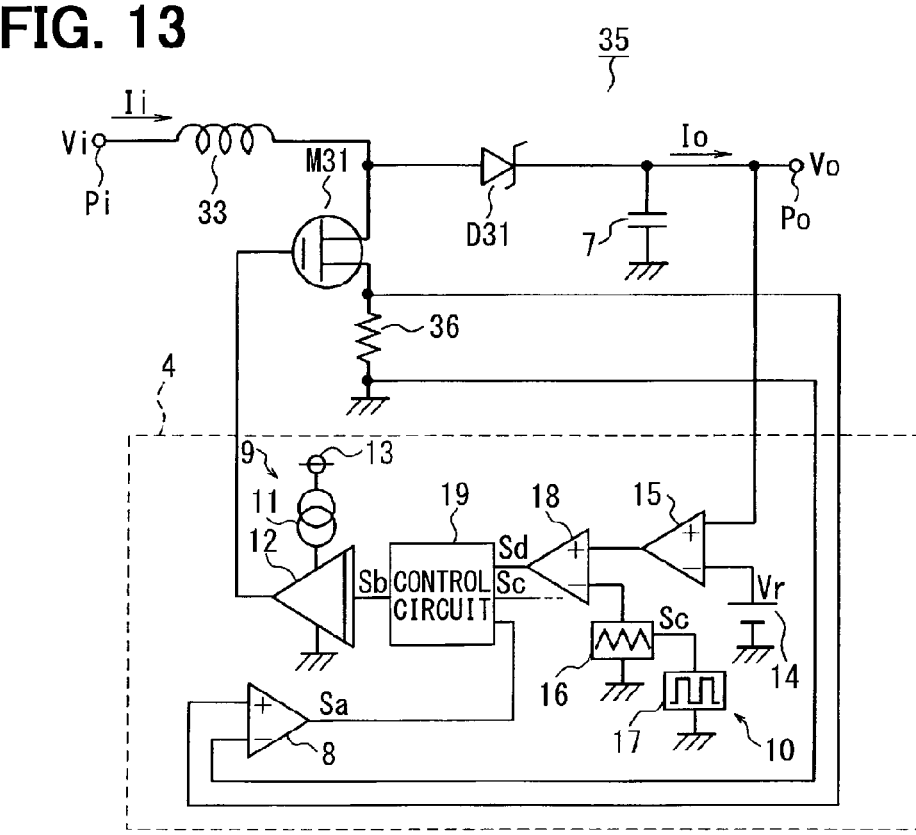
FIG. 13 is a schematic diagram of a switching power supply according to an eighth embodiment of the present disclosure.

A seventh embodiment is described below with reference to FIG. 13. As shown in FIG. 13, a switching power supply 35 according to the eighth embodiment is similar to but differs from the switching power supply 31 shown in FIG. 12 in that it has an additional shunt resistor 36 and that a voltage across the shunt resistor 36 instead of the voltage across the inductor 33 is inputted to the overcurrent detection circuit 8. The shunt resistor 36 is connected in series between the source of the transistor M31 and the ground potential. In this case, the overcurrent detection circuit 8 detects whether an output current Io of the switching power supply 35 exceeds an overcurrent detection threshold Th based on the voltage across the shunt resistor 36. Thus, the same effect and advantage as obtained in the preceding embodiments can be obtained in the seventh embodiment.

(Modification)

While the present disclosure has been described with reference to the embodiments, it is to be understood that the disclosure is not limited to the embodiments. The present disclosure is intended to cover various modifications and equivalent arrangements within the spirit and scope of the present disclosure. For example, the embodiments can be modified as follows.

Figure 14:
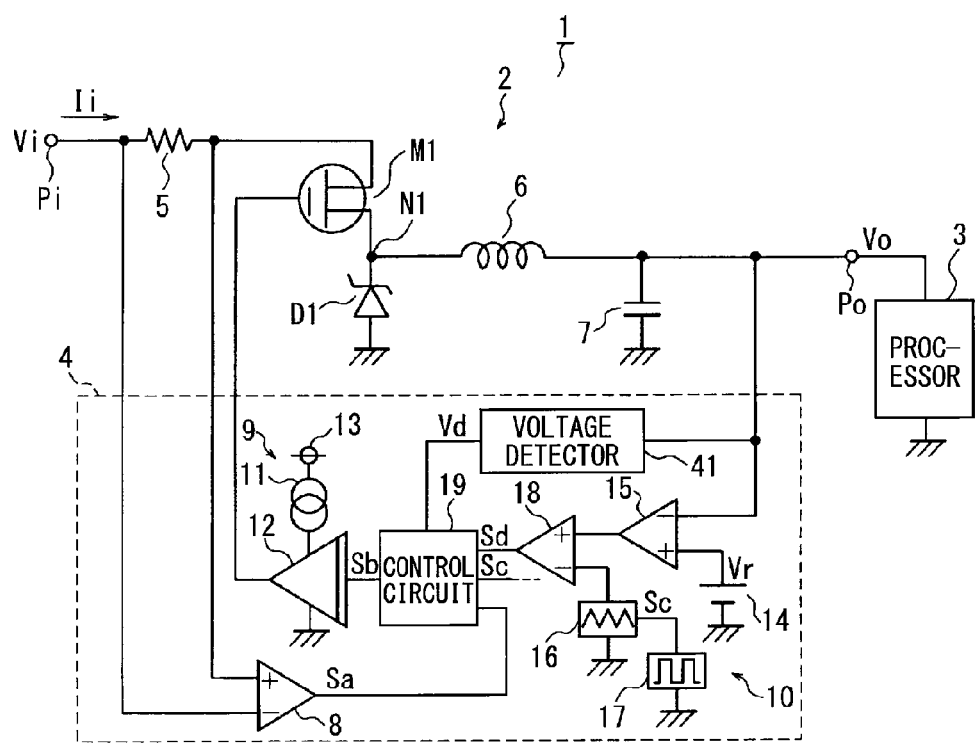
FIG. 14 is a schematic diagram of a switching power supply according to a modification of the embodiments.

In the embodiments, the control circuit 19 ends the forced-OFF action at the start of the first switching period (i.e., at the first rising edge of the oscillation signal Sc) after starting the forced-OFF action. Alternatively, the control circuit 19 can end the forced-OFF action at a different timing. For example, the control circuit 19 can end the forced-OFF action at the start of the Nth switching period after starting the forced-OFF action, where N is a positive integer. Alternatively, as shown in FIG. 14, a voltage detection circuit 41 such as a voltage divisional circuit to detect the output voltage Vo can be added to, for example, the structure shown in FIG. 1, and the control circuit 19 can end the forced-OFF action when the output voltage Vo detected by the voltage detection circuit 41 decreases below a predetermined lower limit after starting the forced-OFF action. In the case, it is possible to prevent the circuit connected to the output stage of the switching power supply from stop operating due to noise or the like by setting the lower limit to a minimum value which allows the circuit connected to the output stage of the switching power supply to operate normally.

In the embodiments, the control circuit 19 continues the forced-OFF action when repeating the forced-OFF action a predetermined number of times. Alternatively, even when repeating the forced-OFF action, the control circuit 19 can end the forced-OFF action at such a predetermined timing as described above.

The transistors M1 and M31 as a switching device are not limited to an N-channel MOS transistor, but can include a P-channel MOS transistor, a bipolar transistor, an IGBT, etc. The diode D1 as a freewheeling diode is not limited to a Schottky barrier diode, but can include a rectifier diode, etc. Alternatively, a switching device can be used instead of a freewheeling diode to form a synchronous rectifier.

In the embodiments, the switching power supply is provided with the switching device as an external device. Alternatively, the switching power supply and the switching device can be incorporated together in a single semiconductor IC.

In the embodiments, the switching power supply is used in the ECU 1 mounted on a vehicle but can be used for any other application.

Such changes and modifications are to be understood as being within the scope of the present invention as defined by the appended claims.

What is claimed is:

1. A switching power supply for converting an input voltage to a predetermined output voltage by controlling a switching device, the switching power supply comprising:
   a controller that controls the switching device;
   a current detector that detects electric current flowing through the switching device; and
   a voltage detector that detects an output voltage of the switching device, wherein
   the controller starts a forced-OFF action to forcedly turn OFF the switching device when the current detected by the current detector exceeds a predetermined threshold and then ends the forced-OFF action at a start of a predetermined switching period, and
   the controller ends the forced-OFF action when the voltage detected by the voltage detector decreases below a predetermined lower limit after starting the forced-OFF action.

2. The switching power supply according to claim 1, wherein,
   the controller is implemented as a semiconductor integrated circuit, and
   the switching device is located outside the semiconductor integrated circuit.

3. An electronic control unit comprising:
   the switching power supply as defined in claim 1, and
   a control processor that operates on power supplied from the switching power supply.

4. The switching power supply according to claim 1, wherein,
   the controller continues the forced-OFF action after repeating the forced-OFF action.

5. The switching power supply according to claim 4, wherein,
   the controller continues the forced-OFF action after repeating the forced-OFF action a predetermined number of times.

6. The switching power supply according to claim 5, wherein,
   the controller has a counter to count a number of times the forced-OFF is executed in total, and
   the controller continues the forced-OFF action after the counted number reaches the predetermined number.

7. The switching power supply according to claim 5, wherein,
   the controller has a counter to count a number of times the forced-OFF is executed in a row, and
   the controller continues the forced-OFF action after the counted number reaches the predetermined number.

8. The switching power supply according to claim 4, wherein,
   the controller continues the forced-OFF action after repeating the forced-OFF action for a predetermined time.

9. A switching power supply for converting an input voltage to a predetermined output voltage by controlling a switching device, the switching power supply comprising:
   a controller that controls the switching device; and
   a current detector that detects electric current flowing through the switching device, wherein
   the controller starts a forced-OFF action to forcedly turn OFF the switching device when the current detected by the current detector exceeds a predetermined threshold and then ends the forced-OFF action at a start of a predetermined switching period,
   the controller continues the forced-OFF action after repeating the forced-OFF action a predetermined number of times,
   the controller continues the forced-OFF action after repeating the forced-OFF action for a predetermined time,
   the controller has a timer to measure a total execution time for which the forced-OFF is executed in total, and
   the controller continues the forced-OFF action after the total execution time reaches the predetermined time.

10. A switching power supply for converting an input voltage to a predetermined output voltage by controlling a switching device, the switching power supply comprising:
   a controller that controls the switching device; and
   a current detector that detects electric current flowing through the switching device, wherein
   the controller starts a forced-OFF action to forcedly turn OFF the switching device when the current detected by the current detector exceeds a predetermined threshold and then ends the forced-OFF action at a start of a predetermined switching period,
   the controller continues the forced-OFF action after repeating the forced-OFF action a predetermined number of times,
   the controller continues the forced-OFF action after repeating the forced-OFF action for a predetermined time, the controller has a timer to measure a continuous execution time for which the forced-OFF is executed continuously, and the controller continues the forced-OFF action after the continuous execution time reaches the predetermined time.

* * * * *